(12) United States Patent  
Toffle et al.

(10) Patent No.: US 9,236,083 B2  
(45) Date of Patent: Jan. 12, 2016

(54) WRITER WITH WORKING FLUID BEARING

(75) Inventors: Mark A. Toffle, Saint Louis Park, MN (US); Xu Zuo, Saint Paul, MN (US); Brent M. Weichelt, Burnsville, MN (US); Louis J. Fioravanti, Boulder, CO (US)

(73) Assignee: Seagate Technology, LLC, Cupertino, CA (US)

( * ) Notice: Subject to any disclaimer, the term of this patent is extended or adjusted under 35 U.S.C. 154(b) by 1833 days.

(21) Appl. No.: 12/050,070

(22) Filed: Mar. 17, 2008

(65) Prior Publication Data

US 2008/0158728 A1 Jul. 3, 2008

Related U.S. Application Data

(63) Continuation of application No. 10/625,717, filed on Jul. 23, 2003, now Pat. No. 7,345,844.

(60) Provisional application No. 60/397,849, filed on Jul. 23, 2002, provisional application No. 60/402,113, filed on Aug. 8, 2002.

(51) Int. Cl.
| | |
|---|---|
| *G11B 33/14* | (2006.01) |
| *G11B 19/20* | (2006.01) |
| *G11B 5/596* | (2006.01) |
| *F16C 32/06* | (2006.01) |

(52) U.S. Cl.
CPC ........ *G11B 19/2009* (2013.01); *G11B 5/59633* (2013.01); *G11B 33/14* (2013.01); *F16C 32/06* (2013.01)

(58) Field of Classification Search
USPC .......... 360/97.02–97.03, 265.2–265.6, 97.22; 384/100
See application file for complete search history.

(56) References Cited

U.S. PATENT DOCUMENTS

| | | | | |
|---|---|---|---|---|
| 3,602,557 | A | * | 8/1971 | Girot .............................. 384/120 |
| 3,620,581 | A | * | 11/1971 | Heller et al. .................. 384/117 |
| 3,726,572 | A | | 4/1973 | Beardmore |
| 3,747,417 | A | | 7/1973 | Beardmore |
| 3,875,589 | A | * | 4/1975 | Applequist et al. ........ 360/78.12 |
| 3,944,304 | A | * | 3/1976 | Purtschert ..................... 384/117 |
| 4,044,558 | A | * | 8/1977 | Benson .......................... 60/520 |
| 4,208,076 | A | | 6/1980 | Gray et al. |
| 4,253,714 | A | * | 3/1981 | Bhushan ....................... 384/278 |
| 4,466,299 | A | | 8/1984 | Mross et al. |
| 4,531,169 | A | * | 7/1985 | Daniels ....................... 360/78.04 |
| 4,531,569 | A | * | 7/1985 | Fritscher ....................... 164/464 |
| 5,065,063 | A | * | 11/1991 | Watanabe ................. 310/156.11 |
| 5,073,036 | A | | 12/1991 | Sutton et al. |
| 5,111,140 | A | * | 5/1992 | Takahata ....................... 324/228 |
| 5,142,872 | A | * | 9/1992 | Tipton ............................ 62/616 |
| 5,172,981 | A | * | 12/1992 | Williams et al. ............... 384/12 |
| 5,193,084 | A | * | 3/1993 | Christiaens ................... 720/696 |
| 5,325,251 | A | * | 6/1994 | Gorove et al. ............. 360/266.5 |
| 5,642,943 | A | * | 7/1997 | Szeremeta .................... 384/100 |
| 5,692,840 | A | | 12/1997 | Rhoton et al. |
| 5,760,509 | A | | 6/1998 | Chung |

(Continued)

FOREIGN PATENT DOCUMENTS

JP 2000090611 A * 3/2000 ............. G11B 21/10

*Primary Examiner* — Brian Miller  
(74) *Attorney, Agent, or Firm* — Hall Estill Attorneys at Law

(57) ABSTRACT

Storing data to a storage medium with a device that has moving parts supported by a bearing and which maintains separation between opposing bearing surfaces in the bearing with a pressurized working fluid.

15 Claims, 16 Drawing Sheets

(56) References Cited

U.S. PATENT DOCUMENTS

| | | | |
|---|---|---|---|
| 5,783,882 A | 7/1998 | Brezoczky et al. | |
| 5,796,542 A * | 8/1998 | Szeremeta | 360/77.02 |
| 5,801,464 A | 9/1998 | Brezoczky | |
| 5,841,607 A | 11/1998 | Khan et al. | |
| 5,845,401 A | 12/1998 | Rhoton et al. | |
| 5,940,246 A | 8/1999 | Khan et al. | |
| 5,957,588 A | 9/1999 | Wahl | |
| 6,018,437 A | 1/2000 | Weichelt et al. | |
| 6,127,756 A | 10/2000 | Iwaki et al. | |
| 6,140,931 A | 10/2000 | Yamane et al. | |
| 6,315,452 B1 * | 11/2001 | Titcomb | 384/114 |
| 6,328,475 B1 | 12/2001 | Jager | |
| 6,445,540 B1 * | 9/2002 | Toffle et al. | 360/137 |
| 6,471,404 B1 * | 10/2002 | Gozdawa | 384/100 |
| 6,552,774 B2 * | 4/2003 | Hase et al. | 355/53 |
| 6,760,180 B2 * | 7/2004 | Kino et al. | 360/75 |
| 6,765,379 B1 * | 7/2004 | Marshall et al. | 324/210 |
| 6,771,459 B1 * | 8/2004 | Komura et al. | 360/99.08 |
| 6,775,088 B2 * | 8/2004 | Toffle et al. | 360/75 |
| 6,788,385 B2 * | 9/2004 | Tanaka et al. | 355/53 |
| 6,788,495 B2 * | 9/2004 | Aiello | 360/99.12 |
| 6,914,742 B1 * | 7/2005 | Fioravanti et al. | 360/75 |
| 6,958,808 B2 * | 10/2005 | Tanaka et al. | 355/72 |
| 6,984,362 B2 * | 1/2006 | Hara et al. | 422/105 |
| 7,027,246 B2 * | 4/2006 | Valeri | 360/48 |
| 7,158,330 B2 * | 1/2007 | Morris et al. | 360/75 |
| 7,199,963 B2 * | 4/2007 | Fukushima | 360/75 |
| 7,345,844 B2 * | 3/2008 | Toffle et al. | 360/97.02 |

\* cited by examiner

FFT (AIR IN SPINDLE AIR BEARING & AIR IN ACTUATOR BEARING)

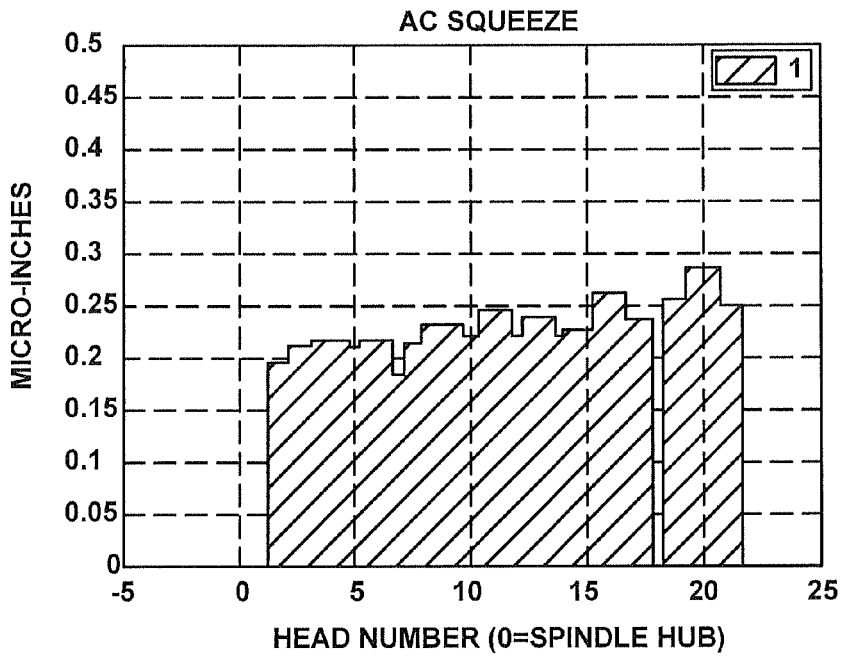
AC SQUEEZE (AIR IN SPINDLE AIR BEARING & AIR IN ACTUATOR BEARING)
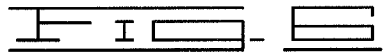
FIG. 6
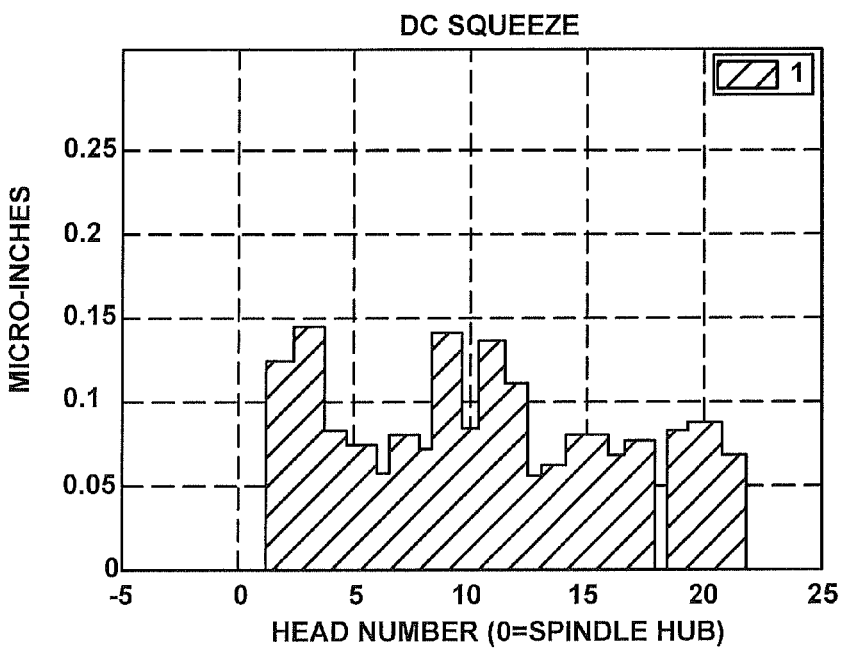
DC SQUEEZE (AIR IN SPINDLE AIR BEARING & AIR IN ACTUATOR BEARING)
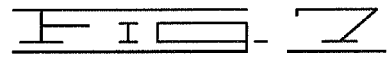
FIG. 7

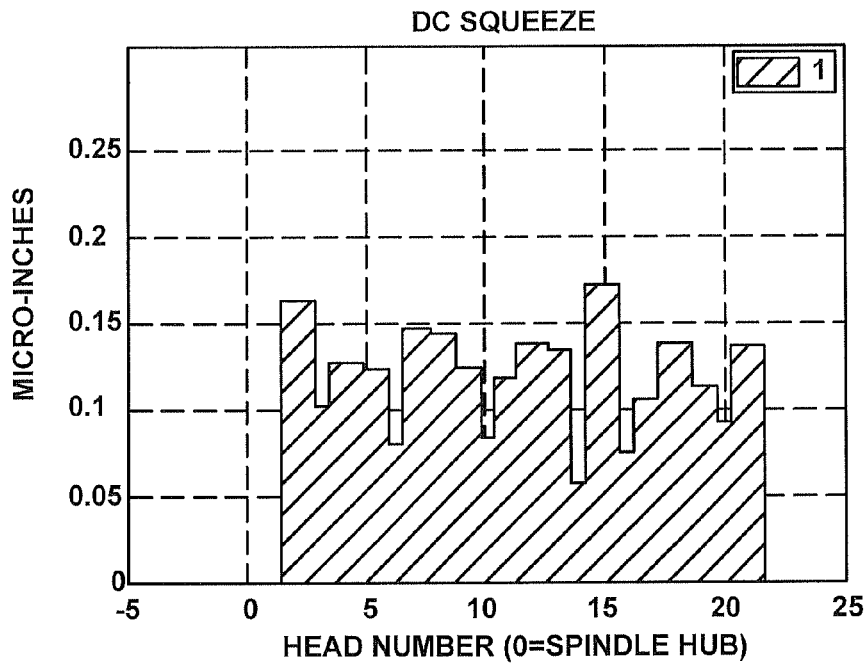
DC SQUEEZE (AIR IN SPINDLE AIR BEARING & AIR IN ACTUATOR BEARING)
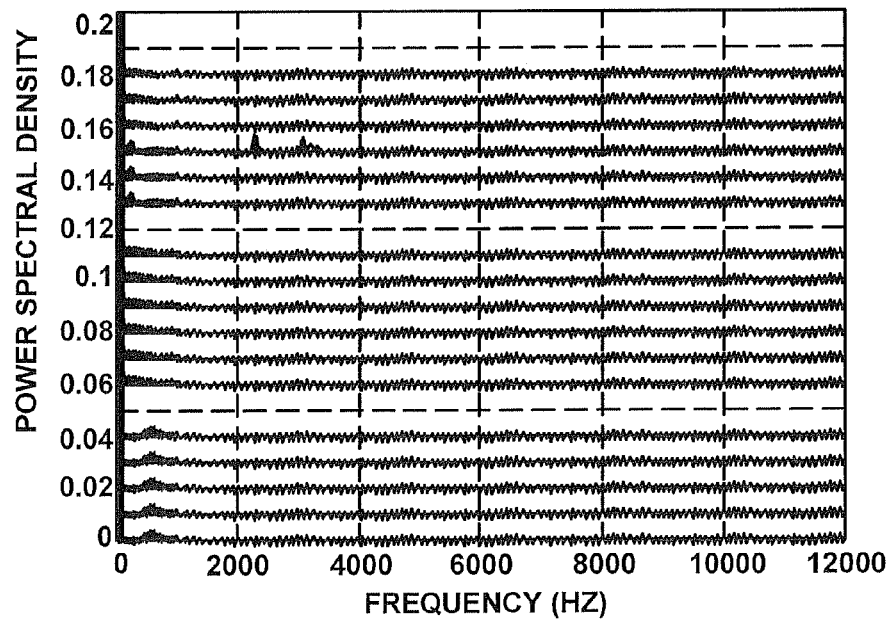
FFT (HELIUM IN SPINDLE AIR BEARING & HELIUM IN ACTUATOR BEARING)
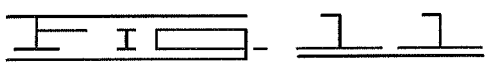

AC SQUEEZE
(HELIUM IN SPINDLE AIR BEARING & HELIUM IN ACTUATOR BEARING)

DC SQUEEZE
(HELIUM IN SPINDLE AIR BEARING & HELIUM IN ACTUATOR BEARING)

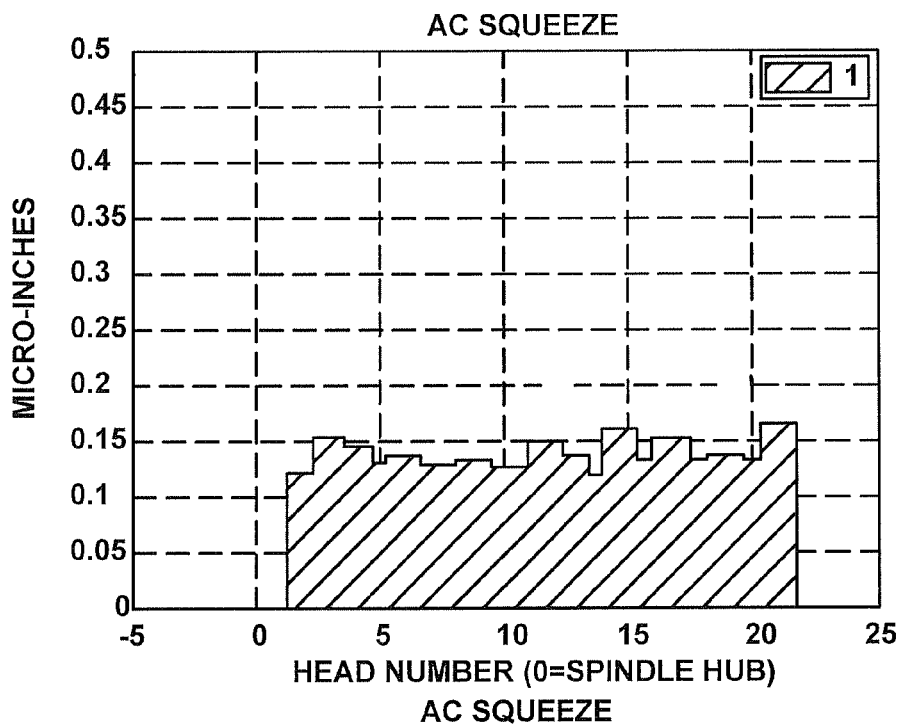
AC SQUEEZE
(HELIUM IN SPINDLE AIR BEARING & HELIUM IN ACTUATOR BEARING)
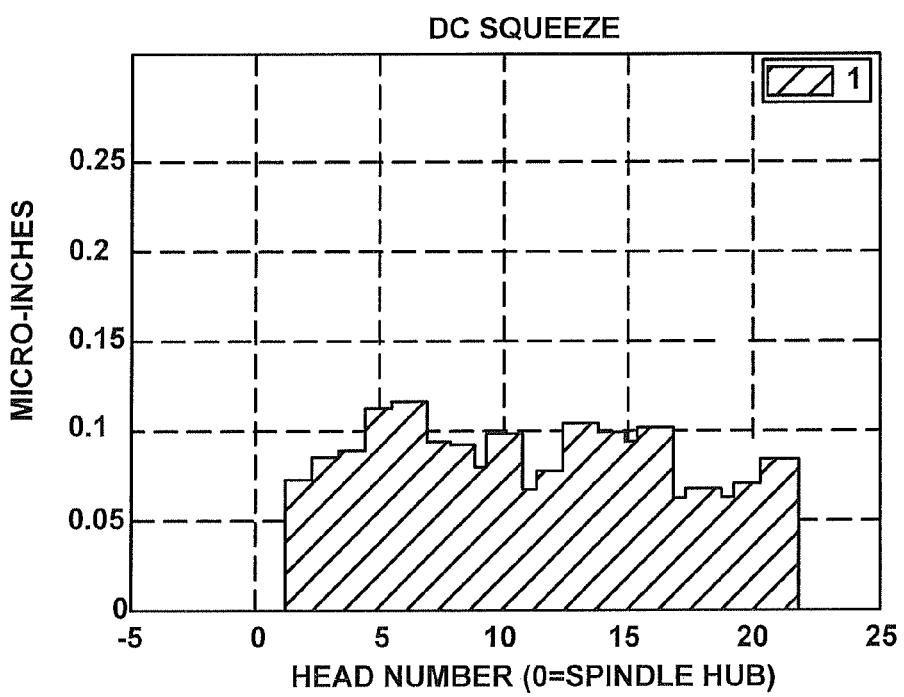
DC SQUEEZE
(HELIUM IN SPINDLE AIR BEARING & HELIUM IN ACTUATOR BEARING)

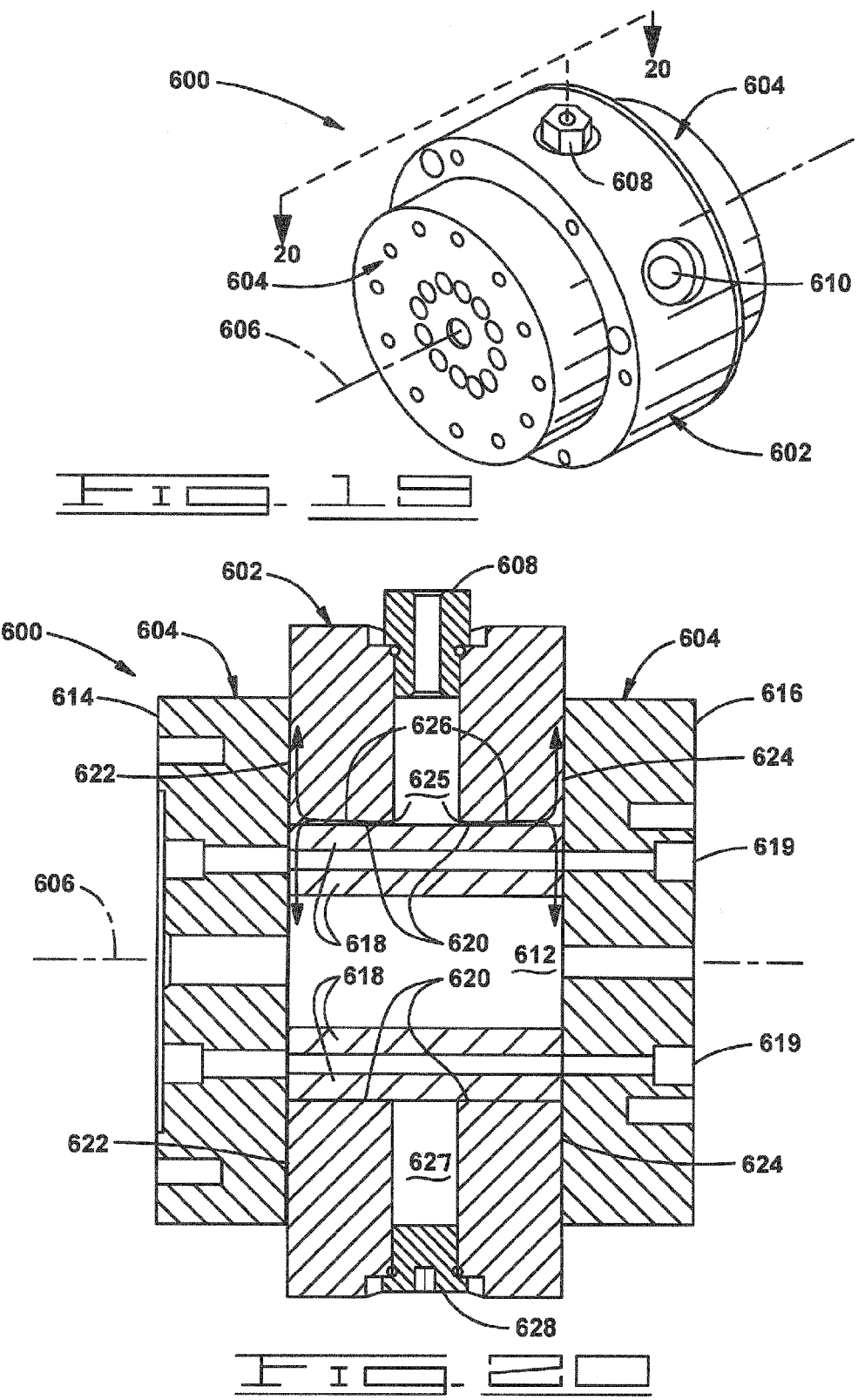

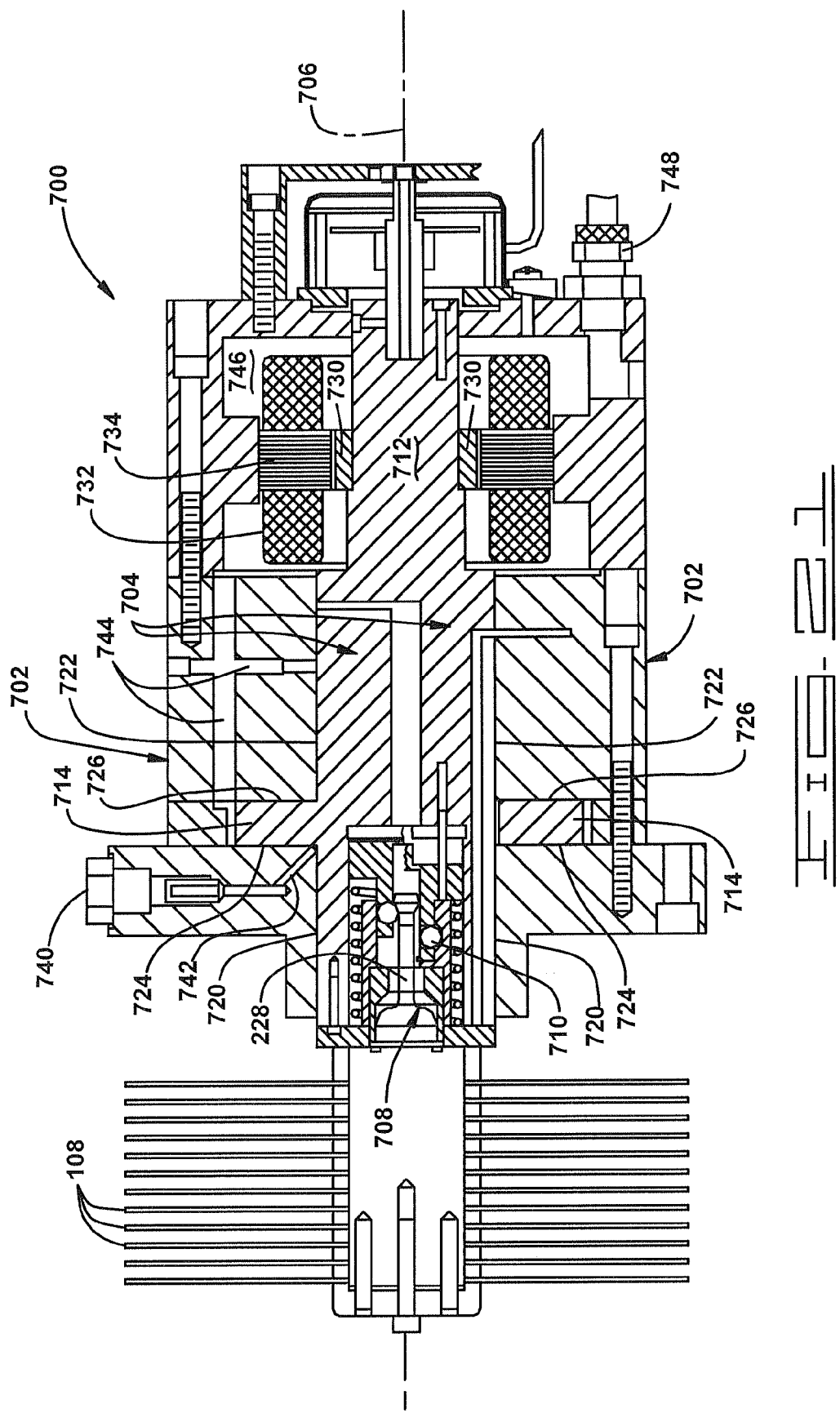

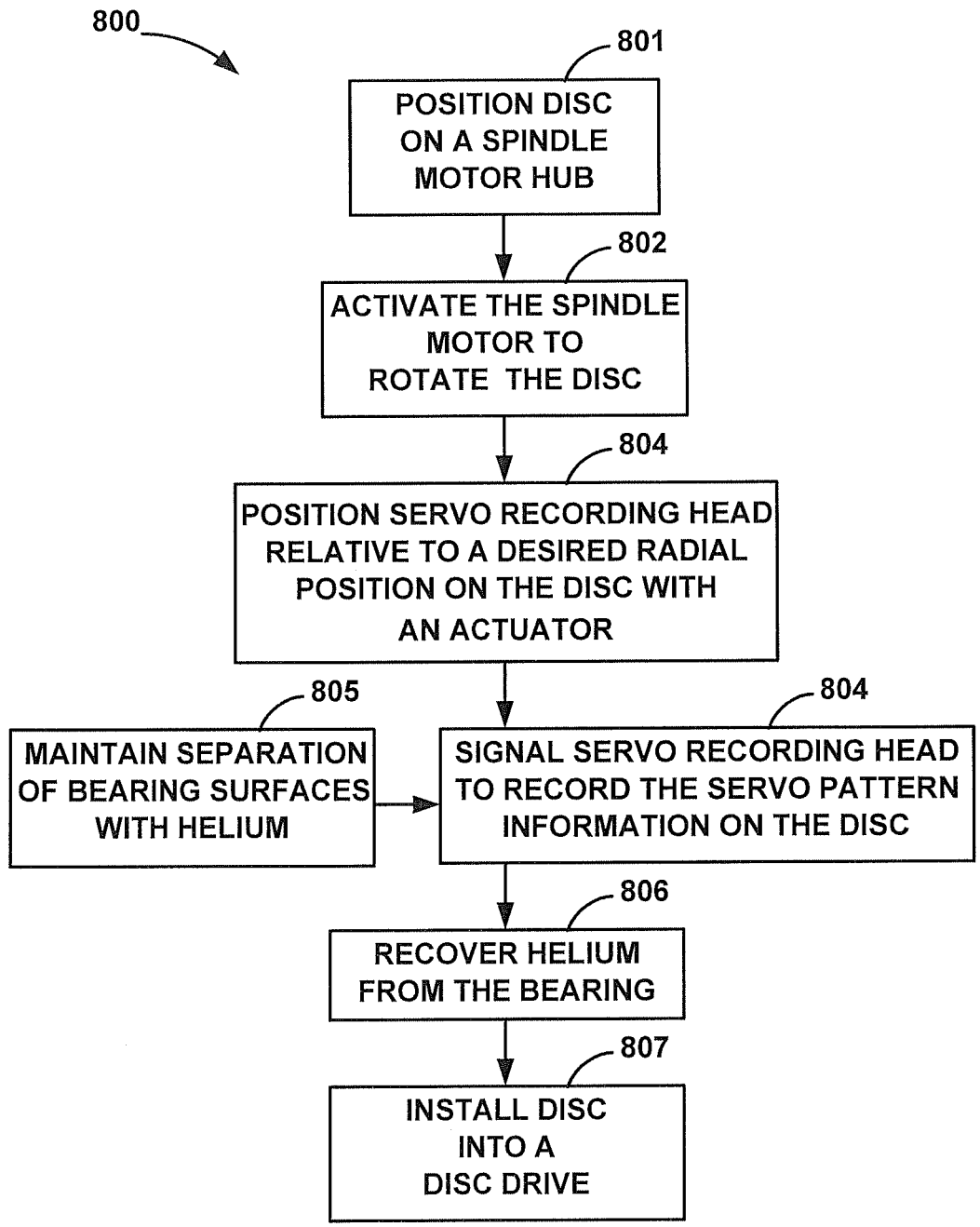

WRITER WITH WORKING FLUID BEARING

CROSS-REFERENCE TO RELATED APPLICATIONS

This application is a continuation of U.S. application Ser. No. 10/625,717 (U.S. Pat. No. 7,345,844) that claims priority to U.S. Provisional Application No. 60/397,849 and U.S. Provisional Application No. 60/402,113.

BACKGROUND

Disc drives are data storage devices that store digital data in magnetic form on a rotating disc. Modern disc drives comprise one or more rigid information storage discs that are coated with a magnetizable medium and mounted on the hub of a spindle motor for rotation at a constant, high speed. Information is stored on the discs in a plurality of concentric, circular tracks typically by an array of transducers (known as "heads"), which are mounted to a radial actuator for movement of the heads relative to the discs. During a write operation, sequential data is written onto a selected one of the disc tracks. During a read operation, the head senses the data previously written onto the disc track and transfers the information to an external environment. Important to both of these operations is the accurate and efficient positioning of the head relative to the center of the desired track. Head positioning within a desired track is dependent on head-positioning servo patterns, i.e., magnetic patterns recorded onto the disc surface and used to maintain optimum track spacing and sector timing. Servo patterns or servo information can be located between the data sectors on each track of a disc (known as "embedded servo" information), or on only one surface of one of the discs within the disc drive (known as "dedicated servo" information). Regardless of whether a manufacturer uses "embedded" or "dedicated" servo information, the servo patterns are typically recorded on the disc or discs during the manufacturing process of the disc drive.

Servo patterns are typically recorded on the magnetizable medium of the disc by a servo-track writer ("STW") assembly during the manufacture of the disc drive. One conventional servo track writer assembly records servo patterns on the discs following installation of the discs into the disc drive. In this embodiment, the servo track writer assembly attaches directly to a disc drive having a disc pack, where the mounted discs on the disc pack have not been pre-recorded with servo patterns. The servo track writer essentially uses the drive's own read/write heads to record the requisite servo patterns directly to the mounted discs. An alternative method for servo pattern recording utilizes a separate apparatus having dedicated servo-recording transducers or heads for recording the servo patterns onto one or more of the discs prior to the discs being assembled into the disc drive. The dedicated servo recording heads can be used to record servo patterns to a number of discs simultaneously, which are subsequently loaded into the disc drive for use.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per millimeter). Increased track density requires more closely-spaced, narrow tracks and therefore enhanced accuracy in the recording of the servo-patterns onto the disc surface. This increased accuracy requires that servo-track recording be accomplished within increased tolerances, while remaining cost effective.

In light of the desire for increased accuracy in the writing of servo patterns, it has been found that vibrations in the servo track writer assembly caused by disc rotation, operation of the spindle motor, and actuator movement can result in inaccurate servo information being written to the disc surface. Inaccurate servo information limits the ability of the electromechanical actuator to accurately position the data head directly over the desired data track during normal track following operations.

Accordingly, there is a desire to reduce or eliminate vibrations during servo track writing operations such that improvements in servo pattern recording accuracy can be achieved. The present invention provides a solution to these and other problems, and offers other advantages over the prior art.

SUMMARY

Embodiments of the present invention are directed to storing data to a storage medium with a device that has moving parts supported by a bearing and which maintains separation between opposing bearing surfaces with a pressurized working fluid.

In some embodiments a writer assembly is provided for recording information on a storage medium. The assembly includes a spindle assembly that has a hub supporting the storage medium, and a spindle motor for rotating the hub. A support member is journalled for rotation relative to the storage medium via a bearing. At least one of the spindle motor and the bearing has a gas-lubricated bearing that operably maintains separation of opposing bearing surfaces with a pressurized working fluid. The assembly also has a data transfer member supported by the support member to record the information on the storage medium as the spindle motor rotates the storage medium and the bearing positions the support member.

In some embodiments an apparatus is provided that includes a storage medium, and a spindle assembly that has a hub supporting the storage medium. A spindle motor rotates the hub, and a support member is journalled for rotation relative to the storage medium via a bearing. At least one of the spindle motor and the bearing has a gas-lubricated bearing that operably maintains separation of opposing bearing surfaces with a pressurized working fluid. The apparatus further has a data transfer member supported by the support member relative to the data storage medium.

In some embodiments a gas-lubricated bearing is provided that has a pressurized working fluid characterized as being helium that maintains a separation of opposing bearing surfaces that operably rotate with respect to each other in the gas-lubricated bearing.

BRIEF DESCRIPTION OF THE DRAWINGS

FIGS. 5-7 are graphs illustrating power spectral density of PES signals, AC squeeze and DC squeeze, respectively, as measured at an outermost servo track while using air as the lubricating fluid in the spindle bearing and in the actuator bearing during servo writing.

FIGS. 8-10 are graphs illustrating power spectral density of PES signals, AC squeeze and DC squeeze, respectively, as measured at an innermost servo track while using air as the lubricating fluid in the spindle bearing and in the actuator bearing during servo writing.

FIGS. 11-13 are graphs illustrating power spectral density of PES signals, AC squeeze and DC squeeze, respectively, as measured at an outermost servo track while using helium as the lubricating fluid in the spindle bearing and in the actuator bearing during servo writing.

FIGS. 14-16 are graphs illustrating power spectral density of PES signals, AC squeeze and DC squeeze, respectively, as measured at an innermost servo track while using helium as the lubricating fluid in the spindle bearing and in the actuator bearing during servo writing.

FIG. 18 is a block diagram illustrating a system for pumping helium into the spindle bearing and actuator bearing of the servo track writer assembly shown in FIGS. 2-4, according to one embodiment of the present invention.

FIG. 19 is a perspective view of a bearing portion of a helium gas-lubricated actuator motor, which can be used in the servo track writer assembly shown in FIGS. 2-4 according to one embodiment of the present invention.

FIG. 20 is a cross-sectional view of the actuator bearing shown in FIG. 19, taken along lines 20-20.

FIG. 21 is a cross-sectional view of a helium gas-lubricated spindle motor, which can be used in the servo track writer assembly shown in FIGS. 2-4 according to one embodiment of the present invention.

FIG. 22 is a flow diagram showing the steps for writing servo patterns on discs in accordance with one embodiment of the present invention.

DETAILED DESCRIPTION

Figure 1:
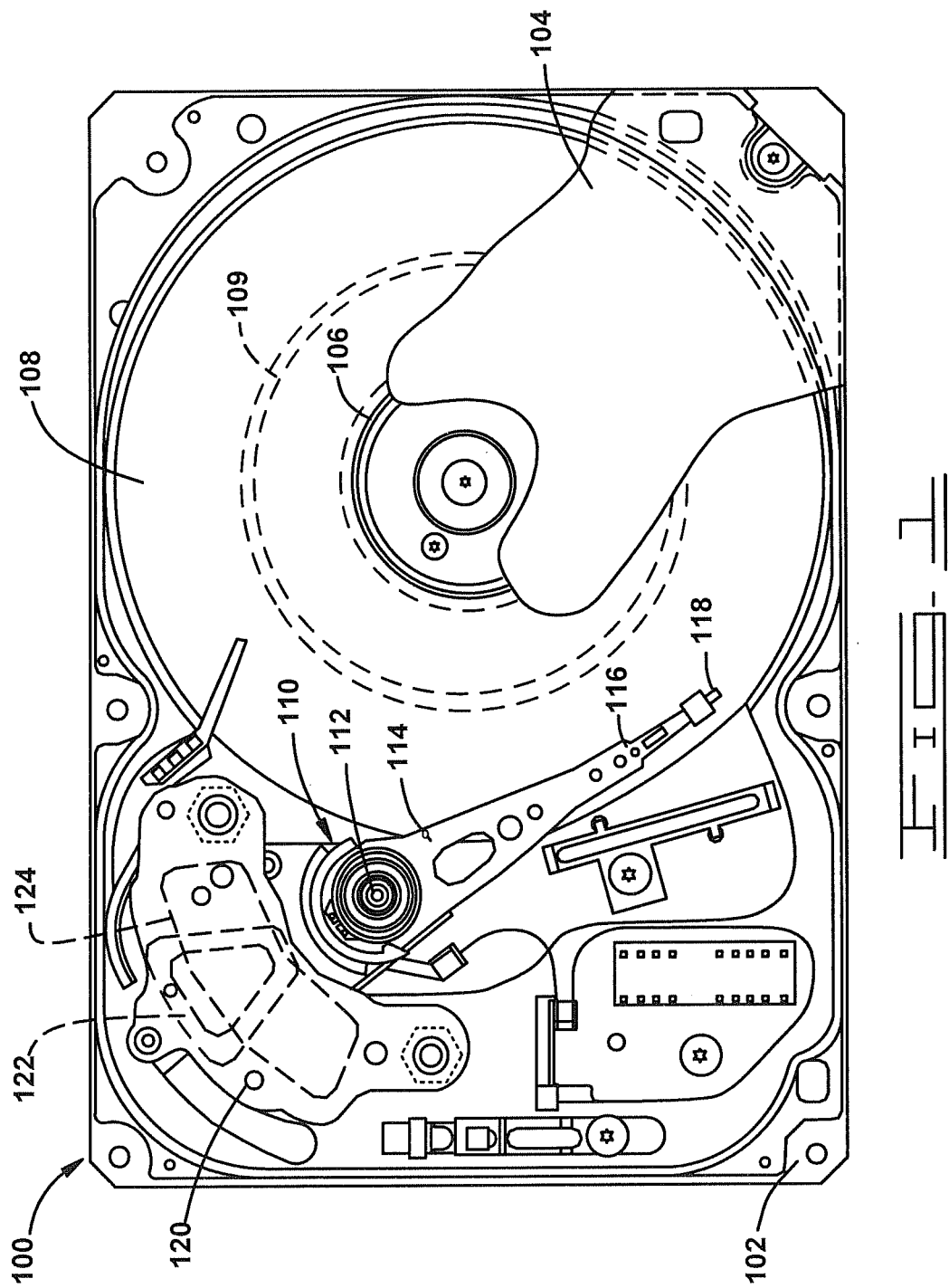
FIG. 1 is a top plan view of a disc drive assembly manufactured using an embodiment of the present invention.

A disc drive 100 manufactured in accordance with an embodiment of the present invention is shown in FIG. 1. The disc drive 100 includes a base 102 to which various components of the disc drive are mounted. A top cover 104, shown partially cut away, cooperates with the base 102 to form an internal, sealed environment for the disc drive 100 in a conventional manner. The components include a spindle motor 106, which rotates one or more discs 108 at a constant high speed. Information is written to and read from tracks, as illustrated by broken line 109, on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of the flexures 116 is a head 118, which includes an air bearing slider (not shown) enabling the head 118 to fly in close proximity above (or in light contact with) the corresponding surface of the associated disc 108.

Radial positioning of the heads 118 is controlled through the use of a voice coil motor 120, which typically includes a coil 122 attached to the actuator assembly 110, as well as one or more permanent magnets 124, which establish a magnetic field in which the coil 122 is immersed. The controlled application of current to the coil 122 causes a magnetic interaction between the permanent magnets 124 and the coil 122 so that the coil 122 moves in accordance with the well-known Lorentz relationship. As the coil 122 moves, the actuator assembly 110 is journalled for rotation around the bearing shaft assembly 112 and the heads 118 are caused to move across the surfaces of the discs 108.

Movement and positioning of the heads 118 over the disc surface relies upon pre-recorded servo information or "servo patterns" on the disc. Servo patterns provide information that specifies the radial positions of the heads. The heads 118 sense the servo patterns, and the resulting servo information is used to generate a position error signal (PES), which represents the distance from which the heads 118 are positioned relative to a desired position. The PES signal can then be used to generate appropriate signals for moving the heads 118 toward the desired position. There are two types of servo patterns commonly used in conventional disc drives, dedicated servo patterns and embedded servo patterns. Dedicated servo patterns are recorded on a dedicated servo disc or disc surface that is used exclusively for servo information. Embedded servo patterns are embedded at regular intervals within normal data tracks. As will be clear from the discussion that follows, either type of servo patterns can be recorded onto a target disc using the methods and apparatus of the present invention.

Figure 2:
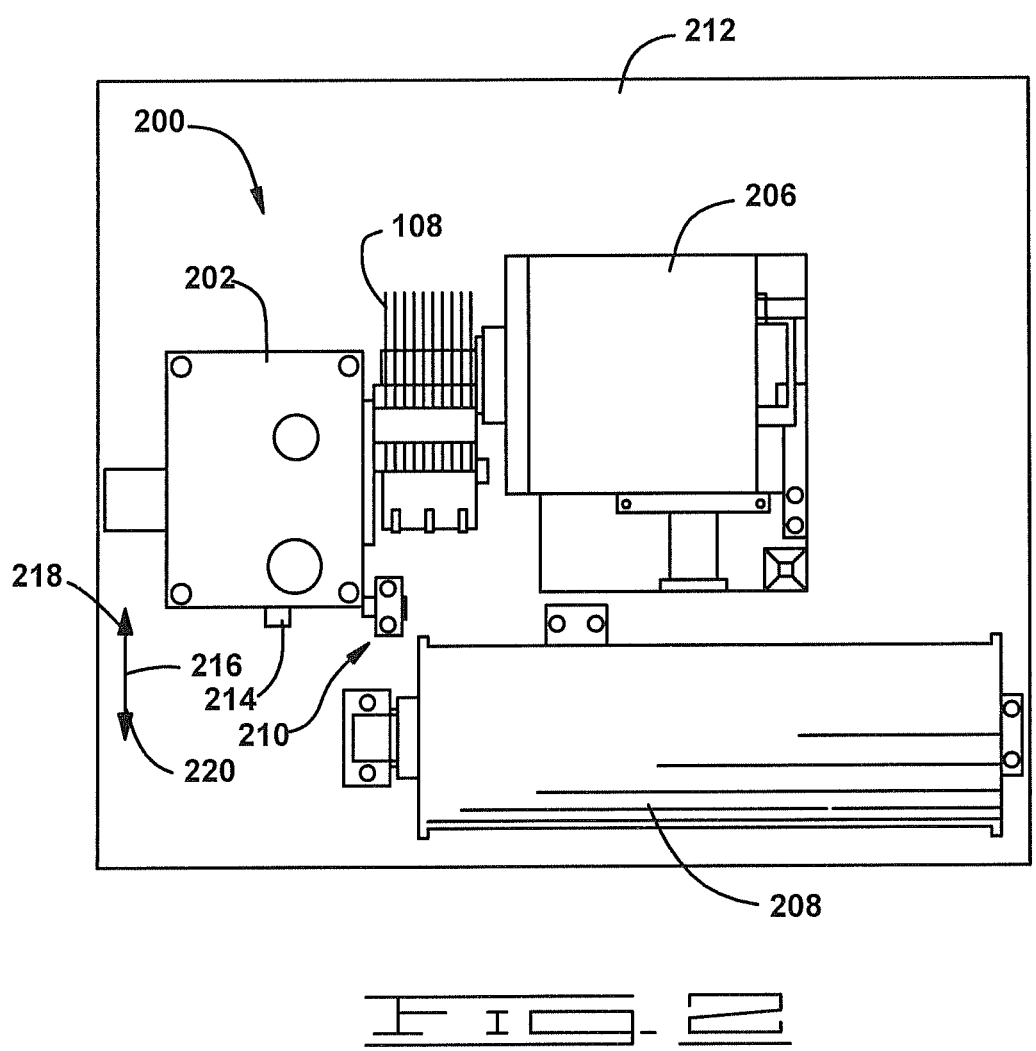
FIG. 2 is a top view of a servo-track writer illustrating an actuator assembly and a spindle motor rotatably supporting a plurality of discs in accordance with an embodiment of the present invention.
Figure 3:
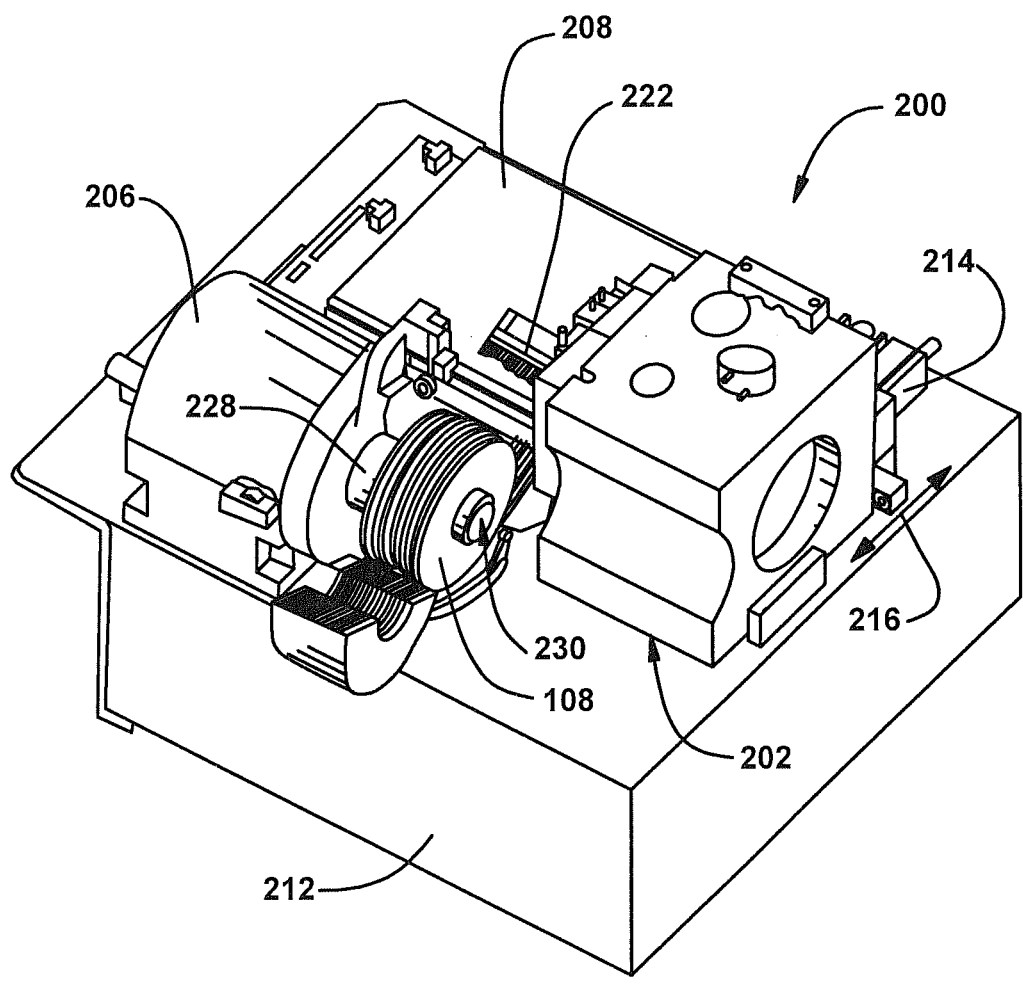
FIG. 3 is a perspective view of the servo-track writer shown in FIG. 2, which illustrates the actuator assembly and the spindle motor in a disc load/unload position.
Figure 4:
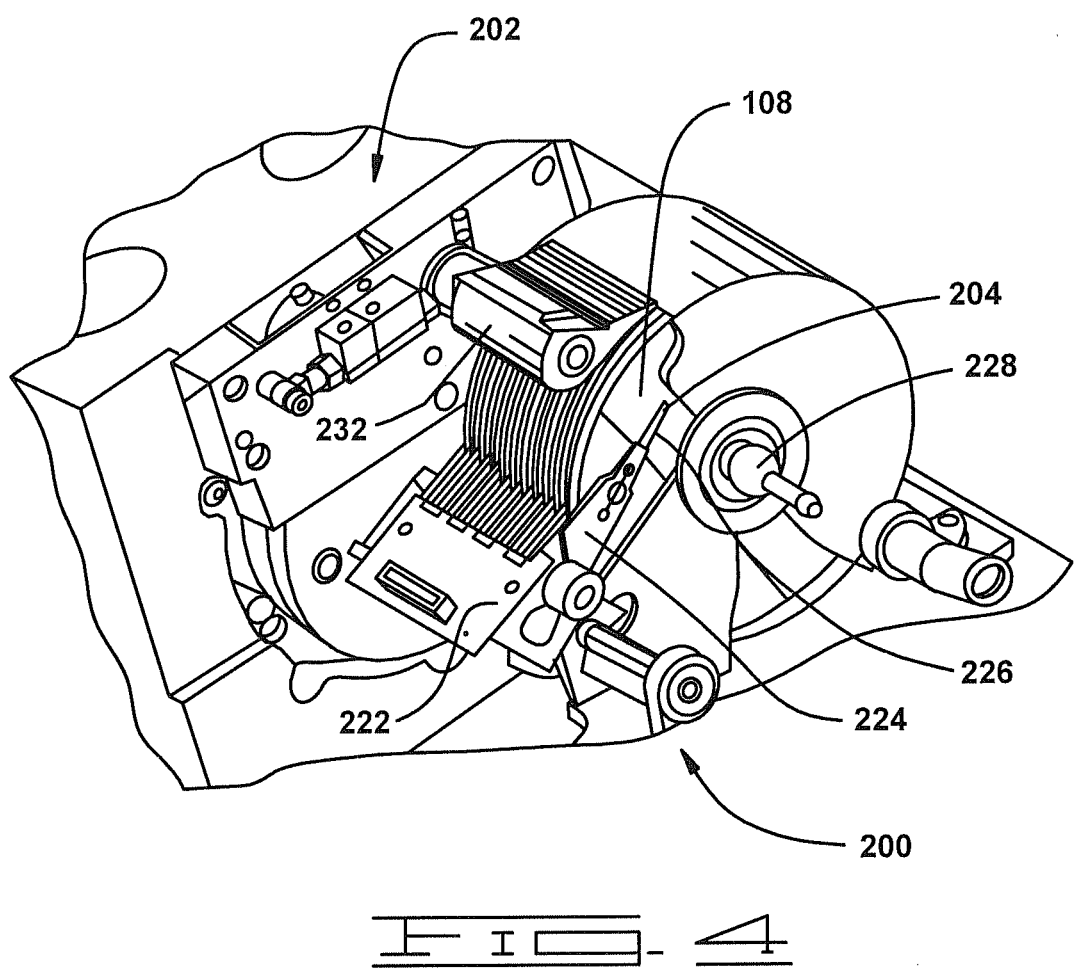
FIG. 4 is a perspective view of the actuator assembly of FIG. 2 engaging the plurality of discs on a spindle motor hub assembly, wherein the spindle motor has been removed for purposes of clarity.
Figure 1B:
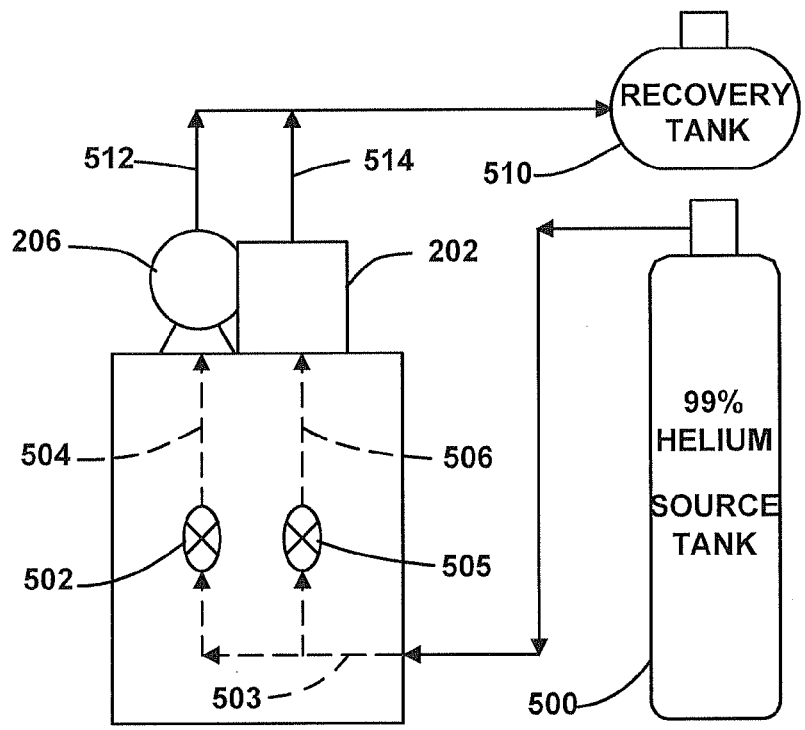

The servo patterns are typically recorded onto the disc surfaces using a servo track writer ("STW") assembly. Servo track writer assemblies can either be stand-alone devices that record the servo patterns onto the disc surfaces before the discs are installed into a disc drive or devices that record the servo patterns through the disc drive's own read/write heads, after the discs have been installed into the disc drive. FIGS. 2-4 illustrate a dedicated servo track writer assembly 200 in accordance with one embodiment of the present invention. Referring to FIG. 2, servo track writer assembly 200 includes an actuator assembly 202 for positioning one or more servo recording heads 204 (shown in FIG. 4) for recording servo patterns onto one or more target discs 108; a spindle motor hub assembly 206 for supporting and rotating the discs 108; a vacuum chuck 208 for rigidly securing the actuator assembly 202 in a desired position for servo track writing; and a laser interferometer 210 for measuring the angular displacement and consequent positioning of the servo-recording heads 204 of the actuator assembly 202 during servo pattern recording.

Servo track writer assembly 200 sits upon a substantially immobile and horizontally positioned platform or base 212. The platform 212 is substantially resistant to movements from impact-type collisions and is preferably a granite slab or other like material having sufficient size to support all the components of the servo track writer assembly 200. Actuator assembly 202 is connected to the platform 212 via a slide mechanism 214 for lateral movement (as indicated by arrow 216) over platform 212 between a servo recording position 218 and a disc loading and unloading position 220, as is discussed in greater detail below. Spindle motor hub assembly 206 and vacuum chuck 208 are directly and non-moveably secured to platform 212.

In the example shown in FIGS. 2-4, actuator assembly 202 and spindle hub assembly 206 are both vertically oriented. That is, the plurality of discs 108, when secured to spindle hub assembly 206, are vertically positioned relative to platform 212. Similarly, actuator assembly 202 includes an E-block 222 (shown in FIG. 3) having a plurality of actuator arms 224

(FIG. 4) that are also arranged for movement in substantially vertical planes relative to the platform 212. Each actuator arm 224 includes one or more flexures 226 connecting a distal end of the actuator arm to a corresponding one of the servo-writing heads 204. However, the actuator assembly and spindle hub assembly can have other orientations, such as horizontal, in alternative embodiments of the present invention.

FIG. 3 illustrates servo track writer assembly 200 in the load/unload position 220, where actuator assembly 202 has been moved away from the spindle hub assembly 206 via the slide mechanism 214. In this position, a stack of discs 108 can be loaded onto spindle hub assembly 206 to start the servo writing process. In one embodiment of the invention, spindle hub assembly 206 includes a detachable spindle hub 228 (shown in FIG. 4), which allows hub 228 and the stack of discs 108 to be detached from spindle motor hub assembly 206, thereby easing the process of loading and unloading discs 108 from spindle hub 228.

Once discs 108 have been loaded on spindle hub assembly 206 with a predetermined gap between adjacent discs, discs 108 are secured to spindle hub assembly 206 by means of a clamp ring 230 (shown in FIG. 3). Actuator assembly 202 is then moved laterally along platform 212 (in the direction of arrow 216) toward the spindle hub assembly 206 to load servo heads 204 onto the disc surfaces. During the loading process, a comb 232 (shown in FIG. 4) can be used to maintain a separation between heads 204 so that actuator assembly 202 and the disc stack 108 can merge without unintentional contact between heads 204 and the discs 108. Comb 232 preferably moves together with actuator assembly 202 as shown in FIG. 4 and acts to separate heads 204 against the bias force of the flexures 226. Once actuator assembly 202 is locked into the servo writing position 218 so that the heads 204 are positioned within the gaps between the adjacent discs 108, comb 232 is rotated away from E-block 222 to allow the heads 204 to engage their respective discs as a result of the bias force provided by the flexures 226. In one embodiment spindle hub assembly 206 is activated to spin the discs 108 at a predetermined rate prior to disengaging the comb 232 to prevent the heads from contacting the disc surfaces. As described above, the rotational motion of discs 108 generates windage so that the heads 204 ride an air bearing in lieu of actually contacting the disc surface. This air bearing counters the bias force applied by the flexures 226 and protects the fragile magnetic coatings on the disc surfaces.

Once the comb 232 is removed so that the heads 204 are fully engaged with their respective discs 108, servo-writing signals are applied to heads 204 to begin the process of recording the servo patterns. During the recording process, E-block 222 is journalled for rotation around a horizontal axis by a bearing assembly within the actuator assembly 202 so that the heads 204 move radially across the surface of their respective discs 108. The position of heads 204 is determined by the laser interferometer 210, which utilizes interferometric techniques to track movement of the heads along the disc radius, and interferometer 210 sends position signals back to control the operation of actuator assembly 202 and thus the radial position of heads 204.

Upon completion of the servo writing process, the E-block 222 is rotated outwardly to position heads 204 adjacent an outer diameter of the discs 108, while comb 232 is rotated into contact with flexures 226 to disengage heads 204 from discs 108. The actuator assembly 202 is then moved laterally away from the spindle hub assembly 206 to the load/unload position 220 so that the discs 108 (complete with their newly written servo patterns) can be removed from the spindle hub assembly 206 and ultimately installed in the disc drive 100.

In dedicated servo track writer assemblies such as that shown in FIGS. 2-4 and in in-situ servo track writer assemblies in which the servo information is written after the disc drive has been assembled, the performance of the spindle bearing and actuator bearing of the writer effect the quality of the servo tracks that are written on the disc surfaces. A low-level asynchronous vibration has been observed in servo track writers that use air bearings in the spindle motor or actuator motor. These vibrations can adversely affect servo track quality characteristics, such as AC squeeze, DC squeeze and Fast Fourier Transform (FFT) spectra. This same vibration phenomenon was observed through a variety of measurement tools or methods, such as a capacitance probe, a laser Doppler velocimeter (LDV), laser or encoder position error signals (PES), or demodulated PES signals. It was also observed with capacitance probes when the spindle motor was mounted vertically or horizontally and was observed in the bearing FFT spectra whether the bearing was spinning or not spinning.

It was discovered that by using helium as the working fluid in the spindle motor bearing and/or the actuator motor bearing during servo track writing, the low-level asynchronous vibrations can be reduced or eliminated for a large range of working fluid pressures, such as pressures up to 120 pounds per square inch (PSI).

1. Test Results

The use of helium versus air as a working fluid in the spindle bearing and the actuator bearing was tested on servo track writer assembly 200 (shown in FIGS. 2-4) using 80 kilo-tracks per inch (TPI) read/write heads, an Alpine 100 kilo-TPI servo pattern and Alpine magnetic discs (available from Seagate Technology, LLC). For each test, the servo tracks were written and then read using either air or helium as the lubricating fluid in the spindle bearing and the actuator bearing as the discs 108 were rotated at 6600 rpm. Data was collected at the outermost servo track (servo track 19,000) and at the innermost servo track (servo track 180,000) on the surfaces of discs 108. The following test results show significant improvements in AC squeeze, DC squeeze and FFT spectra when helium was used at 85 psi in the spindle bearing and at 60 psi in the actuator bearing.

a. Air as Lubricating Fluid

FIGS. 5-10 are graphs illustrating the power spectral density, AC squeeze and DC squeeze as measured at the outermost servo track (servo track 19,000) on the surfaces of discs 108 using air in the spindle bearing and in the actuator bearing.

Figure 5:
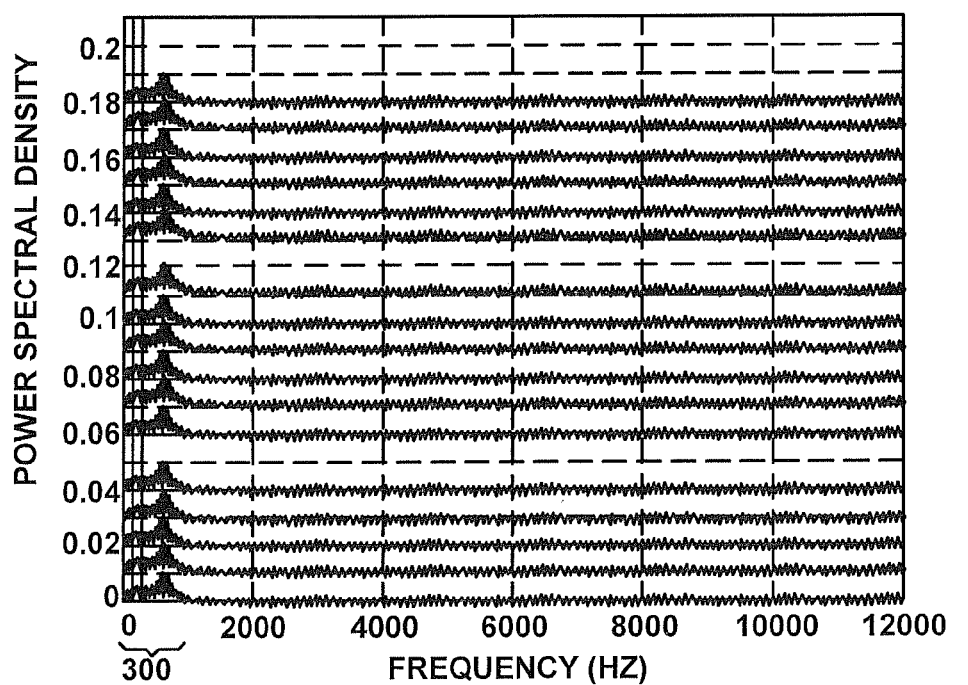

FIG. 5 is a graph, which illustrates the power spectral density of the FFT spectra as a function of frequency when heads 204 (FIG. 4) were positioned at the outermost servo track. The FFT spectra were obtained from PES signals that were demodulated from read signals generated by individual heads 204. Each line in FIG. 5 represents the power spectral density from one of the read heads. In frequency range 300, from about 600 Hz to about 900 Hz, the power spectral density of each PES signal showed a low-level asynchronous vibration, which is generally known as a mechanical "busy signal". This busy signal represents inaccuracy in the positions of the servo patterns that were written on the surfaces of discs 108.

FIG. 6 is a bar chart illustrating AC squeeze in microinches at the outermost servo tracks for the plurality of the individual heads. The AC squeeze is relatively large (from about 0.18 uin. to about 0.28 uin.) due to the busy signals shown in FIG. 5. FIG. 7 is a bar chart illustrating DC squeeze in microinches at the outermost servo tracks for the plurality of the individual heads. Again, the DC squeeze is relatively large (from about 0.05 uin. to almost 0.15 uin.)

Figure 8:
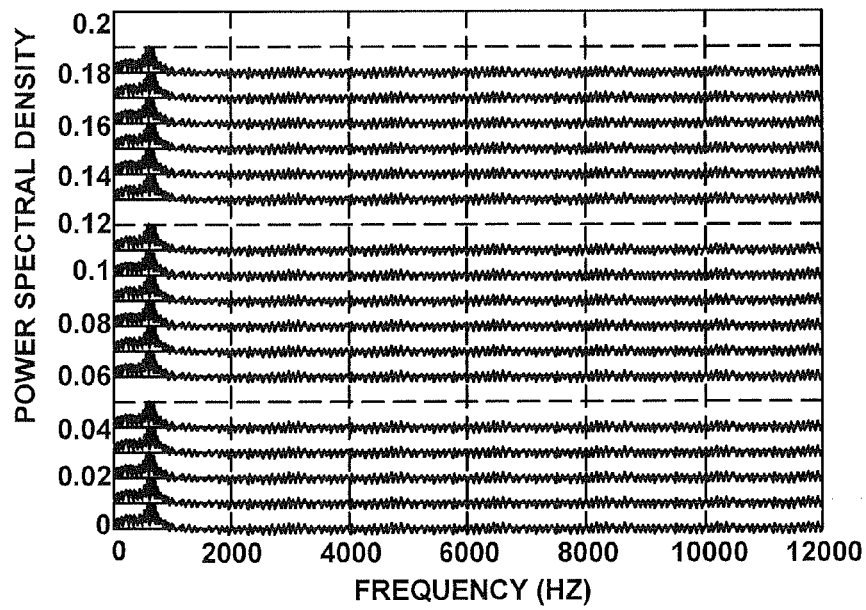
Figure 9:
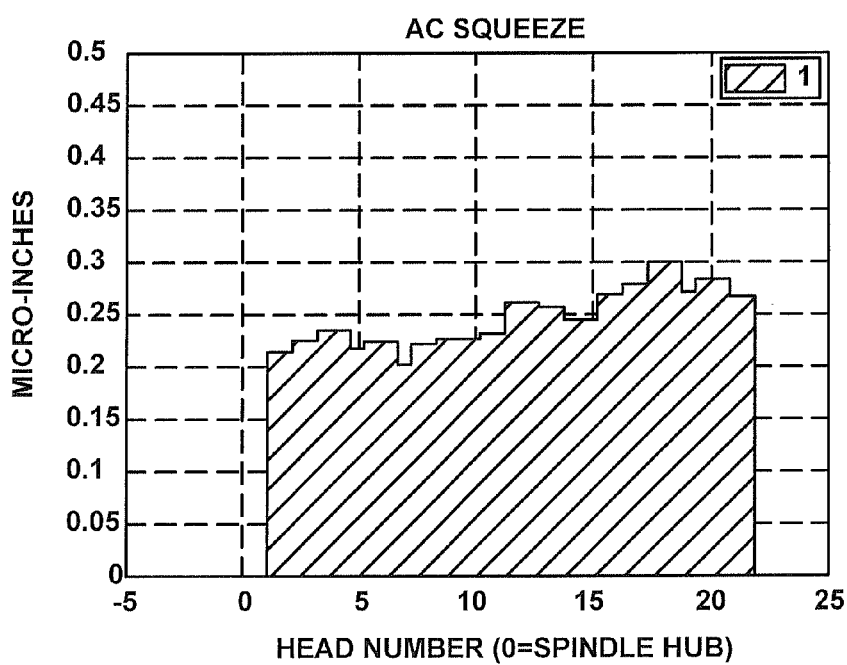

FIGS. 8-10 illustrate the power spectral density, AC squeeze and DC squeeze, respectively, when heads 204 were positioned at the innermost servo track and air was again used as the lubricating in the spindle bearing and in the actuator bearing. Similar to the results shown in FIGS. 5-7, the power spectral density includes a large busy signal in the low frequency ranges, and the AC and DC squeeze are relatively high and in about the same range as at the outermost servo track.

b. Helium as Lubricating Fluid

Figures 12, 13:
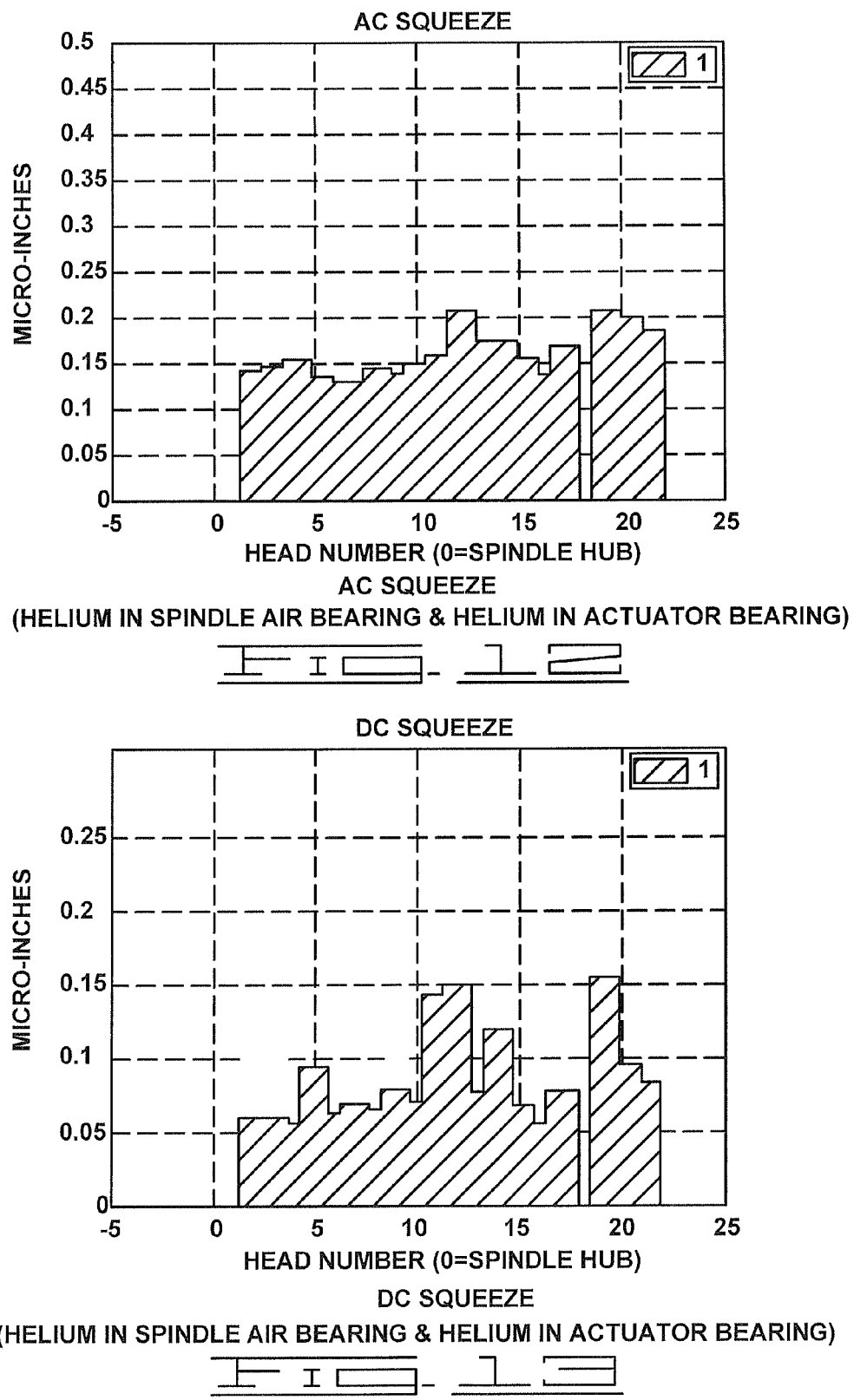
Figure 14:
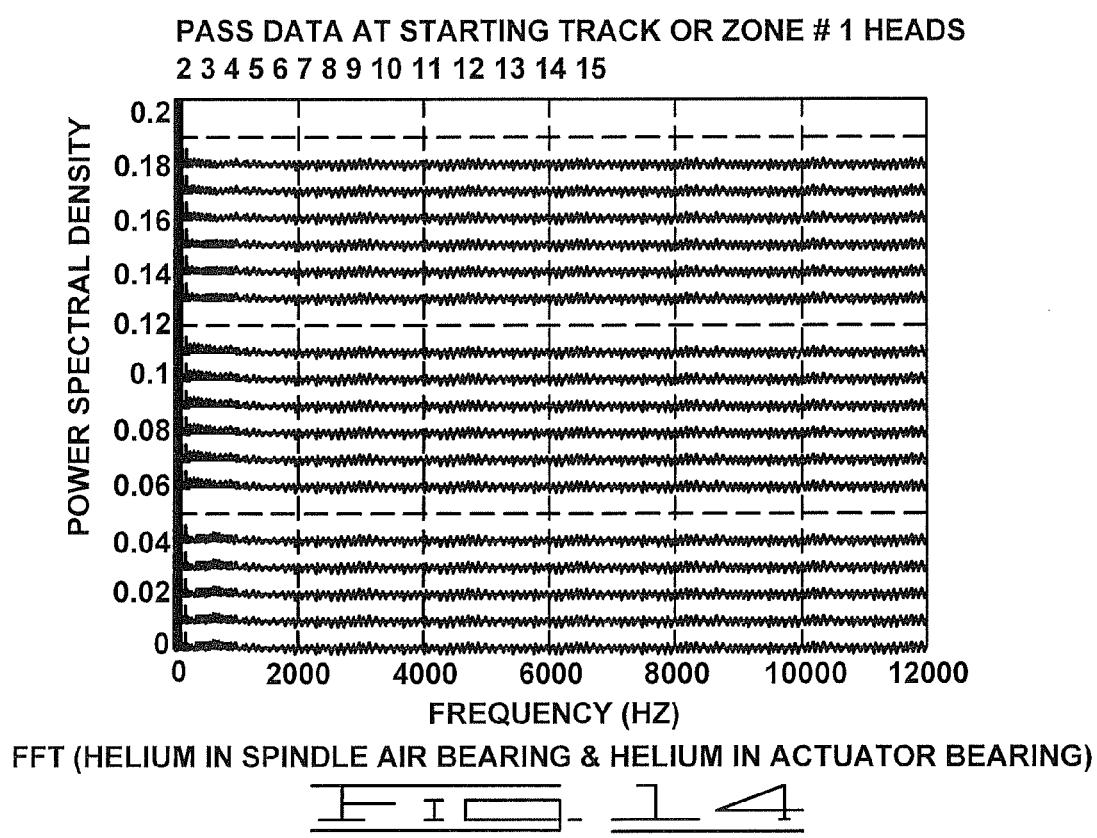

Next, 99% by volume helium was pumped into the spindle bearing at 85 psi and into the actuator bearing at 60 psi and then the servo tracks were written and read on a plurality of disc surfaces with assembly 200. FIGS. 11-13 illustrate the resulting power spectral density, AC squeeze and DC squeeze, respectively, at the outermost servo track, and FIGS. 14-16 illustrate the resulting power spectral density, AC squeeze and DC squeeze, respectively, at the innermost servo track.

FIGS. 11-16 show that the power spectral density in the 600 Hz to 900 Hz frequency range is much lower with the use of helium as a lubricating fluid. Also, the AC squeeze was reduced by about 30% to 45%, and the DC squeeze was reduced by about 20% to 30%. Therefore, by using helium as the lubricating fluid for the spindle and actuator bearings during servo track writing, low-level asynchronous vibrations can be reduced, which allows the servo tracks to be written onto the disc surfaces more accurately.

Helium can therefore be used as the lubricating fluid in the spindle and actuator bearings of a dedicated servo track writer assembly such as that shown in FIGS. 2-4 or in the spindle and actuator bearings of the disc drive with in-situ servo track writing assemblies. If desired, the helium can then be pumped out of the bearings and replaced with a different gas, such as air, once the servo track writing process has been completed.

Figure 17:
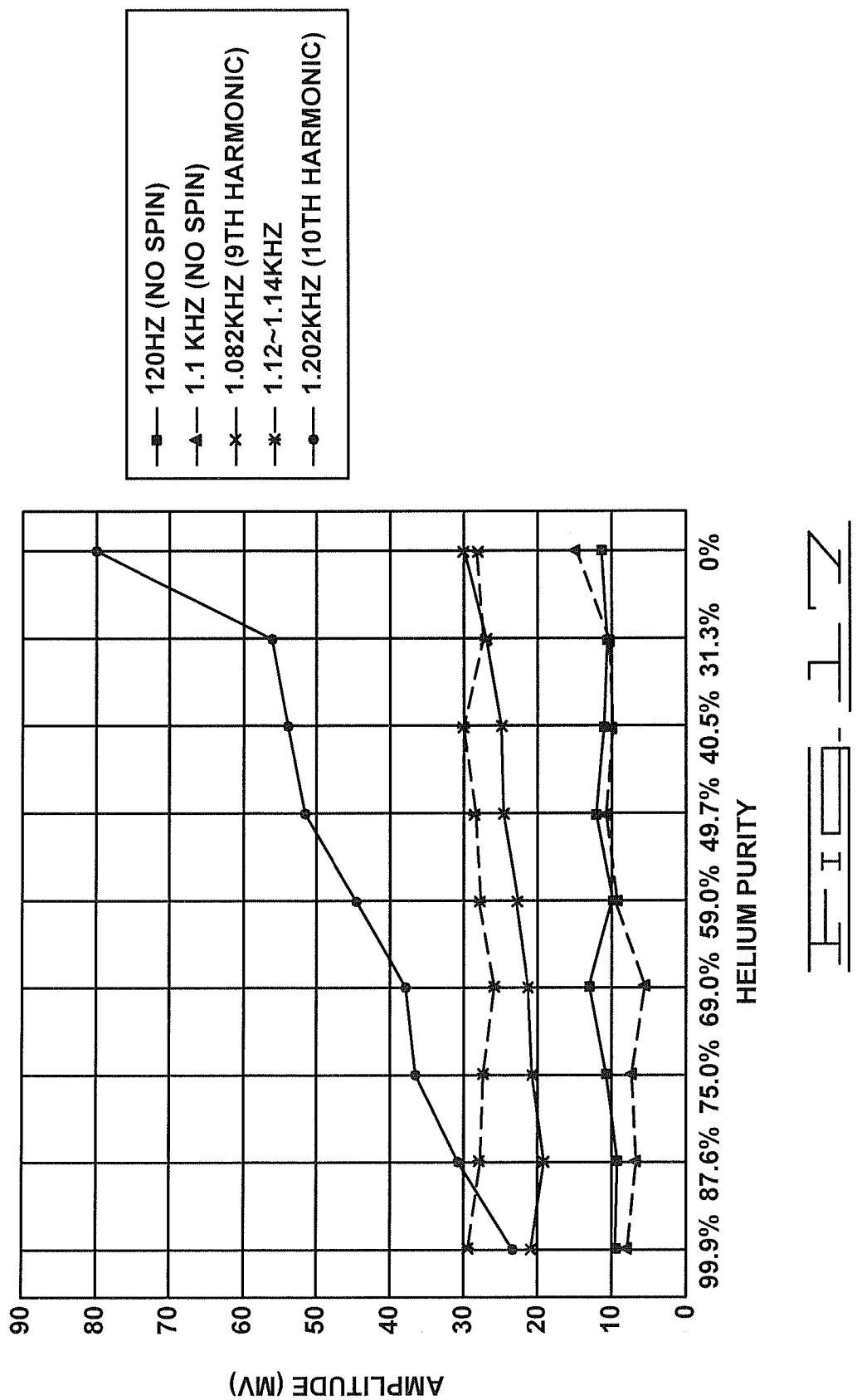
FIG. 17 is a graph illustrating the effect of helium concentration on disc mode vibrations in a gas-lubricated spindle bearing.

Helium can be used in a variety of concentrations. In one embodiment, the working fluid comprises helium at a concentration of at least 70% by volume. In another embodiment, the working fluid comprises helium at a concentration of about 99% by volume. FIG. 17 is a graph illustrating the effect of helium concentration on disc mode vibrations in a gas-lubricated spindle bearing. The error motions of the disc were measured with an LDV pointing at a 65 mm diameter×0.025 thick glass disk spinning at 7200 RPM and 0 RPM (for comparison). The graph shows the disk mode peak amplitudes in millivolts (mV) at 120, 1.1, 1.082, 1.12, and 1.202 KHz. The amplitudes at some frequencies, such as 1.202 KHz in this example, increases as the percentage of helium is reduced. Above a concentration of about 70%, the amplitudes are relatively constant.

FIG. 18 is a block diagram illustrating a system for pumping helium into the spindle bearing and actuator bearing of servo track writer assembly 200 (shown in FIGS. 2-4), according to one embodiment of the present invention. A gas lubricant source tank 500 is coupled to the gas bearing in spindle motor assembly 206 through a pressure regulator 502 and conduits 503 and 504. Source tank 500 is also coupled to the gas bearing in actuator assembly 202 through a pressure regulator 505 and conduits 503 and 506. In one embodiment, source tank 500 includes helium having a concentration of 99% by volume. However, other concentrations can also be used in alternative embodiments of the present invention. A recovery tank 510 can be used to recover helium from the bearings in assemblies 202 and 206 through conduits 512 and 514, respectively. This allows the helium to be recycled for subsequent servo track writing operations.

FIGS. 19 and 20 illustrate an example of a bearing portion of a helium gas-lubricated actuator motor 600, which can be used in actuator assembly 202 (shown in FIGS. 2-4) in one embodiment of the present invention. FIG. 19 is a perspective view of bearing portion 600. Bearing portion 600 includes a stator 602 and a rotor 604. Rotor 604 rotates within stator 602 about axis of rotation 606. Stator 602 has a gas inlet 608 and an exhaust port 610 through which helium gas can be supplied to and retrieved from the gas bearing within bearing portion 600.

FIG. 20 is a cross-sectional view of bearing portion 600 shown in FIG. 19, taken along lines 20-20. Stator 602 has an annular shape, with a central cavity 612. Rotor 604 includes a pair of opposing disc-shaped thrust flanges 614 and 616, which are coupled together through a cylindrical sleeve 618 extending through central cavity 612. Flanges 614 and 616 are coupled to sleeve 618 with bolts (not shown), which are inserted through bores 619, for example. Flanges 614 and 616 and sleeve 618 rotate about axis 606. The mating surfaces between stator 602 and the elements of rotor 604 form axial bearing surfaces 620 and radial bearing surfaces 622 and 624. These bearing surfaces are separated from one another by a small gap. During operation, the gap is maintained by the lubricating gas.

Inlet 608 is coupled to conduit 506 (shown in FIG. 19) for receiving helium gas at a desired pressure from source tank 500. The helium gas passes from inlet 608 into passageway 625 and then along bearing surfaces 620, 622 and 624, as indicated by arrows 626. Some of the helium gas can then be collected through exhaust port 610 (shown in FIG. 19), which is coupled to the bearing surfaces through the passageway similar to passageway 625. Stator 602 further includes a passageway 627, which is capped with a plug 628. The gas lubricated bearing shown in FIGS. 19 and 20 is provided as an example only. Any other gas lubricated bearing design can be used in alternative embodiments of the present invention.

FIG. 21 is a cross-sectional view of a helium gas lubricated spindle motor 700 according to one embodiment of the present invention. Spindle motor 700 can be used within spindle motor hub assembly 206 (shown in FIGS. 2-4) for driving spindle hub 228 and the plurality of discs 108 with reduced asynchronous vibrations during the servo track writing process. Spindle motor 700 includes a stator 702 and a rotor 704. Rotor 704 rotates within stator 702 about axis of rotation 706. Rotor 704 has a receiver 708 for receiving spindle hub 228. A ball latch mechanism 710 locks hub 228 within receiver 708.

Rotor 704 has a main body portion 712 and a thrust flange 714, which rotate about axis 706. The outer surfaces of rotor 704 and the opposing surfaces of stator 702 are spaced from one another by a small gap, which forms a gas-lubricated bearing having axial bearing surfaces 720 and 722 and radial bearing surfaces 724 and 726.

Rotor 704 carries one or more magnets 730, which are driven by a rotating magnetic field supplied by a stator winding 732 and a stator core 734. Winding 732 and core 734 are carried by stator 702. As is well-known in the art, commutation pulses supplied to winding 732 generate a rotating magnetic field along core 734, which drives magnets 730 and thus rotor 704.

Spindle motor 700 further includes a gas inlet 740 for receiving helium gas from conduit 504 (shown in FIG. 18). Inlet 740 is coupled to the gaps between bearing surfaces 720, 722, 724 and 726 through an inlet passageway 742. Spindle motor 700 further includes exhaust pick-up passageways 744, which recover helium gas from the gaps. Exhaust passageways 744 direct the pressurized gas from the bearing gaps through winding cavity 746 and out exhaust port 748. Exhaust port 748 can be coupled to conduit 512 (shown in FIG. 18) for recovering the helium gas.

In the embodiments shown in FIGS. 19-21, the spindle motor and actuator motor are configured with hydrostatic gas-lubricated bearings, which use an external pressurized fluid source to maintain bearing surface separation. In an alternative embodiment, either or both of the spindle motor and the actuator motor can be configured as a hydrodynamic bearing, which generates a self-pumping pressure internal to the bearing in order to maintain the bearing surface separation. Other configurations can also be used. The desired gas pressure within the gas-lubricated bearings is a function of the individual bearing design and its application.

FIG. 22 is a flow chart illustrating a process 800 of writing servo information on a data storage disc according to one embodiment of the present invention. At step 801, the disc is positioned on a hub of a spindle motor of a dedicated servo track writing assembly, prior to installation into a disc drive. At step 802, the servo track writer assembly activates the spindle motor to rotate the disc. At step 803, the servo track writing assembly positions a servo recording head relative to a desired radial position on the disc with an actuator. The actuator has an actuator motor. The servo track writing assembly then signals the servo recording head to record the servo pattern information on the disc, at step 804. During step 804, the servo track writing assembly maintains separation of opposing bearing surfaces with a working fluid in a gas-lubricated bearing within one or both of the spindle motor and the actuator motor, at step 805, wherein the working fluid includes helium. At step 806, the servo track writing assembly recovers the helium from the gap through an exhaust port in the gas-lubricated bearing. At step 807, the disc, with its newly written servo pattern information is installed within a disc drive.

Figure 23:
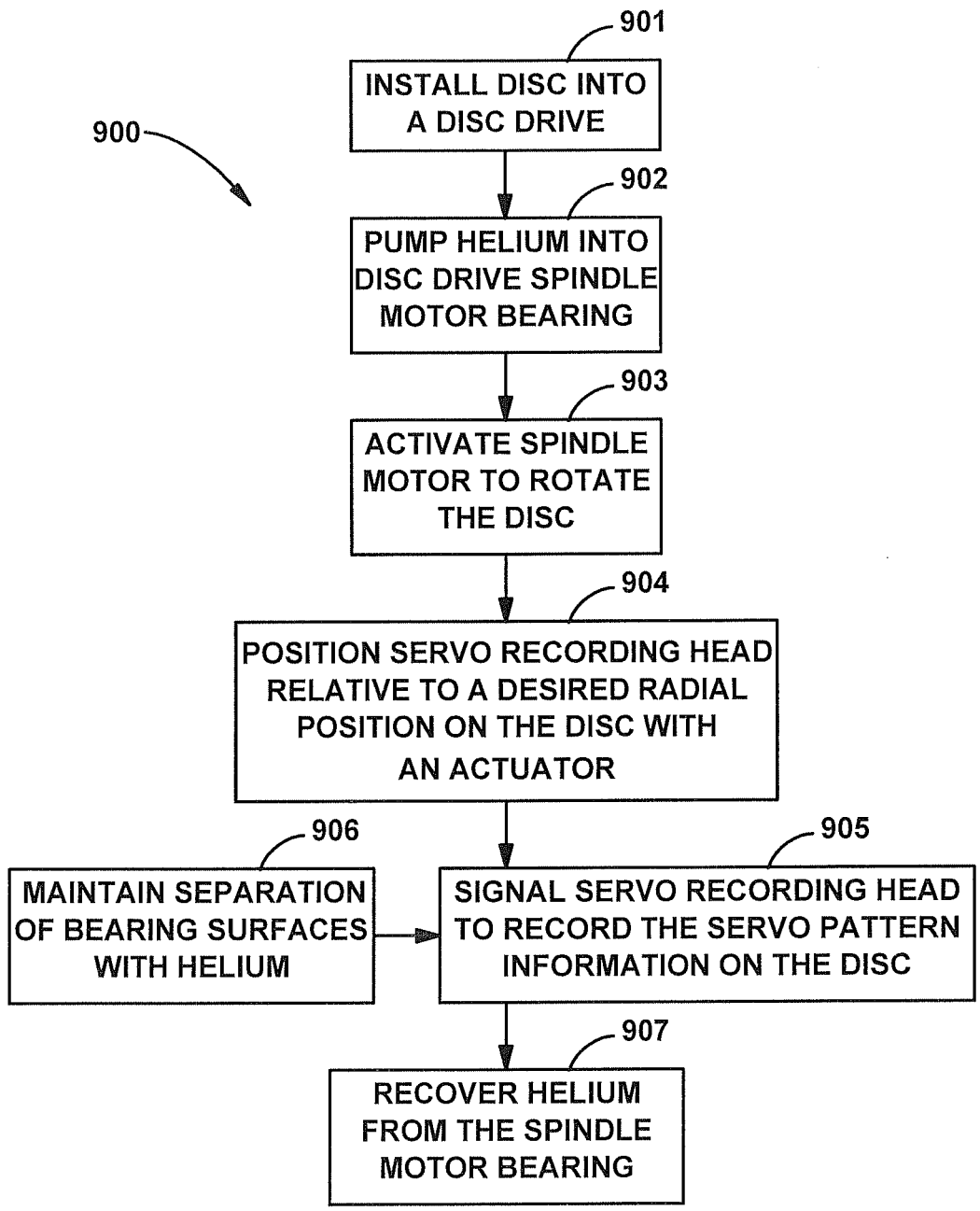
FIG. 23 is a flow diagram showing the steps for writing servo patterns on discs in accordance with another embodiment of the present invention.

FIG. 23 is a flow chart illustrating a process 900 of writing servo information on a data storage disc according to an alternative embodiment of the present invention. At step 901, the disc is installed on a hub of a spindle motor and assembled into a disc drive. If the spindle motor has a gas-lubricated bearing, then helium is pumped into the spindle motor bearing at step 902. At step 903, the spindle motor is activated to rotate the disc. At step 904, a servo recording head is positioned relative to a desired radial position on the disc with an actuator. The actuator can be an actuator installed in the disc drive or a separate actuator of a servo track writing assembly onto which the disc drive is mounted. In one embodiment, the actuator that is used to position the servo recording head has a gas-lubricated bearing, which also uses helium gas as a lubricating fluid. The servo track writing assembly (or the product disc drive) then signals the servo recording head to record the servo pattern information on the disc, at step 905. During step 905, the helium maintains separation of opposing bearing surfaces in the gas-lubricated bearings within one or both of the spindle motor and the actuator motor, at step 906. At step 907, the helium is recovered from an exhaust port in the gas-lubricated bearings.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, helium gas can be used in various concentrations as the working fluid in a gas-lubricated spindle motor and/or actuator motor during the writing of servo patterns to the disc surfaces or during normal operation of a data storage system having any type of storage media. The spindle and actuator motors can have any suitable physical configuration. Also, helium gas can be used in other gas-lubricated bearing applications, such as precision grinders, cutting tools, gyroscopes aid mirror polishing equipment, for reducing asynchronous vibrations. Other applications also exist.

What is claimed is:

1. A writer assembly for recording information on a storage medium, the assembly comprising:
a spindle assembly having a hub operably supporting the storage medium and further having a spindle motor operably rotating the hub;
a bearing comprising:
a stator defining a bore; and
a rotor having a sleeve matingly engaging the bore to define opposing axial bearing surfaces, the rotor further having first and second thrust flanges connected to opposing ends of the sleeve and matingly engaging respective opposing surfaces of the stator to define first and second opposing radial bearing surfaces;
a support member depending from the rotor and thereby journalled for rotation relative to the storage medium via the bearing, at least one of the spindle motor and the bearing being a gas-lubricated bearing having an inlet operably connected to a supply of a pressurized working fluid; and
a data transfer member operably supported by the support member to record the information on the storage medium as the spindle motor rotates the storage medium and the bearing positions the support member.

2. The writer assembly of claim 1 wherein the gas-lubricated bearing comprises an outlet in fluid communication with the inlet.

3. The writer assembly of claim 2 further comprising:
a gas source coupled to the inlet to supply the working fluid; and
a gas recovery receptacle coupled to the outlet.

4. The writer assembly of claim 3 wherein the gas source and the gas recovery receptacle are capable of supplying and recovering helium, respectively.

5. The writer assembly of claim 1 wherein the gas-lubricated bearing comprises a hydrodynamic bearing.

6. The writer assembly of claim 1 wherein the spindle motor is a dedicated writing device that is external to a data storage device in which the storage medium is operably utilized.

7. The writer assembly of claim 1 wherein the spindle motor is mounted within a data storage device in which the storage medium is operably utilized.

8. The writer assembly of claim 1 wherein the gas lubricated bearing comprises a hydrostatic bearing.

9. The writer assembly of claim 1 wherein the working fluid comprises helium.

10. An apparatus comprising:
a storage medium;
a spindle assembly having a hub operably supporting the storage medium and further having a spindle motor operably rotating the hub;
a bearing comprising:
a stator defining a bore; and a rotor having a sleeve matingly engaging the bore to define opposing axial bearing surfaces; the rotor further having first and second thrust flanges connected to opposing ends of the sleeve and matingly engaging respective opposing surfaces of the stator to define first and second opposing radial bearing surfaces;

a support member depending from the rotor and thereby journalled for rotation relative to the storage medium via the bearing, at least one of the spindle motor and the bearing being a gas-lubricated bearing having an inlet operably connected to a supply of a pressurized working fluid; and a data transfer member operably supported by the support member relative to the data storage medium.

11. The apparatus of claim 10 wherein the gas-lubricated bearing comprises an outlet in fluid communication with the inlet.

12. The apparatus of claim 11 further comprising:
a gas source operably coupled to the inlet to supply the working fluid; and
a gas recovery receptacle operably coupled to the outlet.

13. The apparatus of claim 10 wherein the gas-lubricated bearing comprises a hydrodynamic bearing.

14. The apparatus of claim 10 wherein the spindle motor is a dedicated writing device that is external to a data storage device in which the storage medium is operably utilized.

15. The apparatus of claim 10 wherein the spindle motor is mounted within a data storage device in which the storage medium is operably utilized.

\* \* \* \* \*